US 8,456,424 B2

(12) United States Patent  
Katsura

(10) Patent No.: US 8,456,424 B2
(45) Date of Patent: Jun. 4, 2013

(54) INPUT DISPLAY DEVICE, ELECTRONIC APPARATUS, AND COMPUTER-READABLE RECORDING MEDIUM

(75) Inventor: Yukiko Katsura, Osaka (JP)

(73) Assignee: Kyocera Document Solutions Inc. (JP)

( * ) Notice: Subject to any disclaimer, the term of this patent is extended or adjusted under 35 U.S.C. 154(b) by 648 days.

(21) Appl. No.: 12/505,285

(22) Filed: Jul. 17, 2009

(65) Prior Publication Data

US 2010/0079377 A1 Apr. 1, 2010

(30) Foreign Application Priority Data

Sep. 30, 2008 (JP) ................................. 2008-252393

(51) Int. Cl.
*G06F 3/02* (2006.01)
(52) U.S. Cl.
USPC ........... 345/168; 345/174; 345/175; 345/176; 345/173; 345/156; 341/22; 710/36; 715/840; 715/841
(58) Field of Classification Search
USPC .................. 345/168, 173, 354, 650, 684, 838, 345/593, 594, 645, 810, 819, 820, 863; 715/530, 715/531, 539, 540, 840–841; 341/22; 710/36; 726/26, 27, 28; 326/8
See application file for complete search history.

(56) References Cited

U.S. PATENT DOCUMENTS

| 7,062,497 B2 * | 6/2006 | Hamburg et al. ................. 1/1 |
| 2001/0049704 A1 * | 12/2001 | Hamburg et al. ............. 707/530 |
| 2005/0066274 A1 * | 3/2005 | Fujishige et al. ............. 715/517 |
| 2005/0226530 A1 * | 10/2005 | Murayama .................... 382/276 |
| 2007/0146806 A1 * | 6/2007 | Ishihara ....................... 358/405 |

FOREIGN PATENT DOCUMENTS

| CN | 1680912 | 10/2005 |
| JP | 06-095825 | 4/1994 |
| JP | 06-342358 | 12/1994 |
| JP | 1996-263210 | 10/1996 |
| JP | 2008-263210 | 10/1996 |
| JP | 08-314680 | 11/1996 |
| WO | 02069278 | 9/2002 |

* cited by examiner

*Primary Examiner* — Lun-Yi Lao
*Assistant Examiner* — Olga Merkoulova
(74) *Attorney, Agent, or Firm* — McDonnell Boehnen Hulbert & Berghoff LLP

(57) ABSTRACT

An input display device comprises an operation panel including a first display operation area that enables operation screens to be switched hierarchically based on a selected operation key and to display a fixed-arrangement of operation keys in respective layers, and a second display operation area that displays an operation history indicating that the operation key has been selected; a selected key use determination unit configured to determine which of the operation keys has been selected when the operation key is selected from one of the first display operation area and the second display operation area; a storage processing unit configured to successively store results determined by the selected key use determination unit into a storage device as operation history information; and a selected key use history display control unit configured to display the operation history information stored in the storage device into the second display operation area.

16 Claims, 14 Drawing Sheets

INPUT DISPLAY DEVICE, ELECTRONIC APPARATUS, AND COMPUTER-READABLE RECORDING MEDIUM

INCORPORATION BY REFERENCE

This application is based upon and claims the benefit of priority from the corresponding Japanese Patent Application No. 2008-252393, filed Sep. 30, 2008, the entire contents of which is incorporated herein by reference.

BACKGROUND OF THE INVENTION

1. Field of the Invention

The present invention relates to an input display device, an electronic apparatus, and computer-readable recording medium storing input display program codes, and more particularly, to an input display device, an electronic apparatus, and a computer-readable recording medium that enable an operation history to be displayed in response to a selection of an operation key.

2. Description of the Related Art

As illustrated in FIG. 14, a typical touch panel provided to an image forming apparatus or the like has operation keys arranged on a sheet (tab). A user thereof can cause a desired processing to be executed by selecting a necessary operation key.

Here, the respective operation keys are arranged such that operation keys associated with each other are arranged hierarchically in a program. The user can perform an operation in detail by a lower-layer operation key with regard to a function selected by an upper-layer operation key. The user can perform settings on the desired processing by selecting various functions and repeatedly selecting the operation keys stepwise.

Also proposed is a touch panel device in which a layout can be changed automatically so as to allow frequently-used operation keys to be displayed at predetermined positions. The touch panel device displays the frequently-used operation keys as direct keys on a screen at all times. A direct key used less frequently than another operation key is replaced by another operation key.

SUMMARY OF THE INVENTION

An input display device according to an embodiment of the present invention comprises an operation key, an operation panel, a selected key use determination unit, a storage processing unit, and a selected key use history display control unit. The operation key is selected to execute a predetermined processing. The operation panel includes a first display operation area and a second display operation area. The first display operation area enables operation screens to be switched hierarchically based on the selected operation key and to display a fixed-arrangement of operation keys in respective layers. The second display operation area displays an operation history indicating that the operation key has been selected. The selected key use determination unit is configured to determine which of the operation keys has been selected when the operation key is selected from one of the first display operation area and the second display operation area. The storage processing unit is configured to successively store results determined by the selected key use determination unit into a storage device as operation history information. The selected key use history display control unit is configured to display the operation history information stored in the storage device into the second display operation area.

Further, an electronic apparatus according to the embodiment of the present invention comprises an input device and a processing executing device. Here, the input device receives an instruction to execute a predetermined processing. The processing executing device executes the predetermined processing based on the instruction received by the input device. In addition, the input device includes the above-mentioned input display device.

Further, a computer-readable recording medium according to the embodiment of the present invention stores input display program codes. The input display program codes comprise a first program code, a second program code, a third program code, a fourth program code and a fifth program code. Here, the first program code causes an operation key to be selected and to execute a predetermined processing associated with the selected operation key. The second program code causes an operation panel to display the first display operation area and a second display operation area. The first display operation area enables operation screens to be switched hierarchically based on the selected operation key and to display a fixed-arrangement of operation keys in respective layers. The second display operation area displays an operation history indicating that the operation key has been selected. The third program code causes a selected key use determination unit to determine which of the operation keys has been selected, when the operation key is selected from one of the first display operation area and the second display operation area. The fourth program code causes a storage processing unit to successively store results determined by the selected key use determination unit into a storage device as operation history information. The fifth program code causes a selected key use history display control unit to display the operation history information stored in the storage device into the second display operation area.

The foregoing and other features and advantages of an illustrative embodiment of the present invention will be more readily apparent from the following detailed description, which proceeds with references to the accompanying drawings.

DETAILED DESCRIPTION OF THE PREFERRED EMBODIMENT

An input display device such as a typical touch panel may have a function of displaying frequently-used operation keys as direct keys at predetermined positions on a screen at all times. A direct key used less frequently than another operation key is automatically replaced by another operation key, and hence a layout of the direct keys changes often.

Therefore, a user sometimes fails to perceive where a desired operation key is displayed. This reduces operability.

Further, after making settings by continuously selecting the operation keys, the user finds it hard to confirm what kind of operation settings have been made. This raises a problem that the desired operation key is hard to locate when the previously-selected operation is to be corrected.

According to the present invention, by employing a configuration as described below, it becomes possible for a user to operate the input display device with convenience and comfort.

Hereinafter, description is made of a preferred embodiment of the present invention with reference to the accompanying drawings.

The present invention can be applied to any kind of input display device and electronic apparatus. The embodiment is described below by applying the present invention to a touch panel as the input display device and an image forming apparatus as the electronic apparatus.

Figure 1:
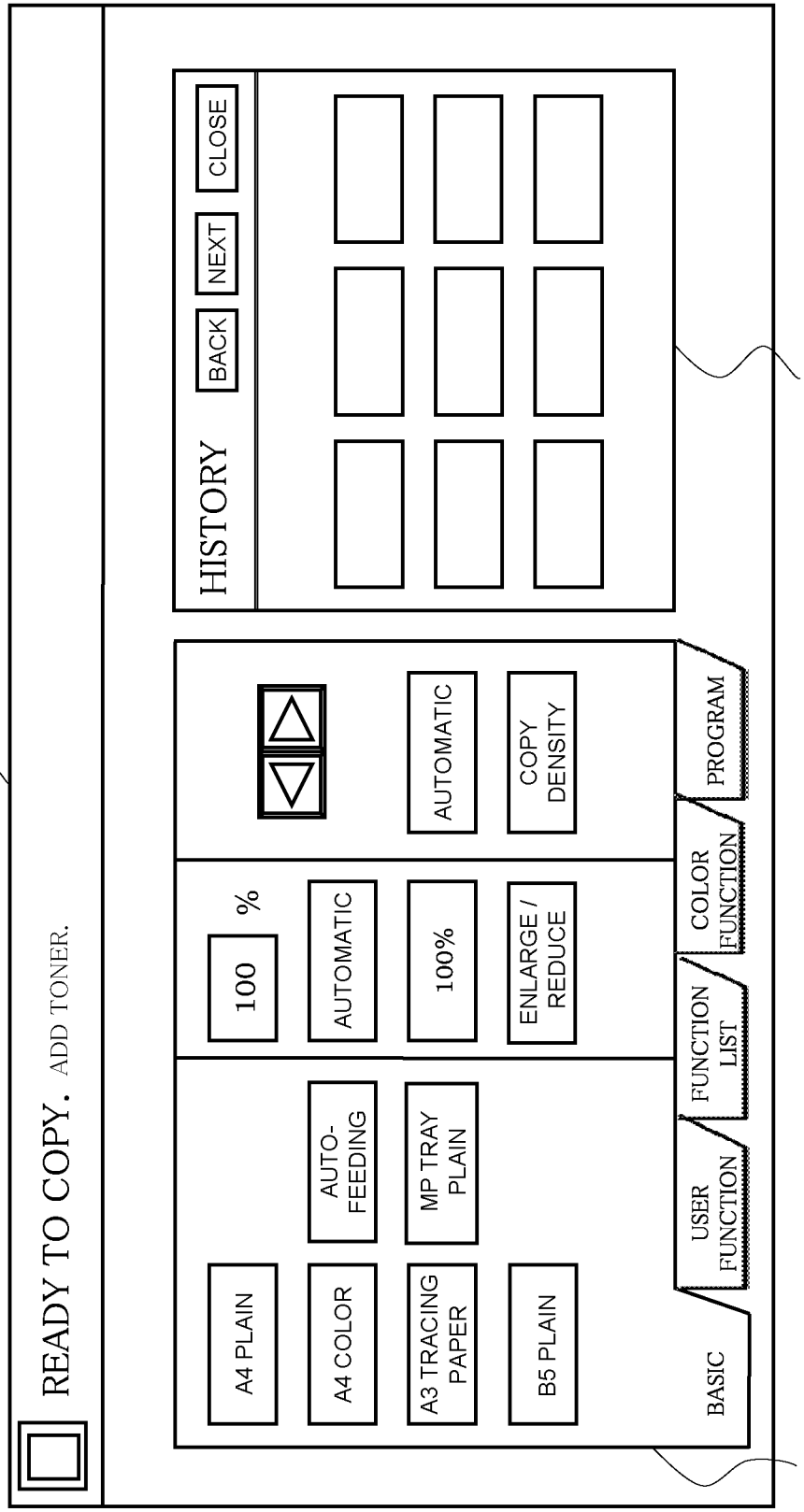
FIG. 1 illustrates a diagram of a display screen of a touch panel provided to an image forming apparatus according to an embodiment of the present invention.

FIG. 1 is referenced to describe the input display device according to the embodiment of the present invention. FIG. 1 illustrates a diagram of a display screen of a touch panel provided to the image forming apparatus according to the embodiment of the present invention.

A screen of a touch panel 1 includes a basic setting screen 2 and an operation history screen 3, which are configured independently of each other.

Figure 14:
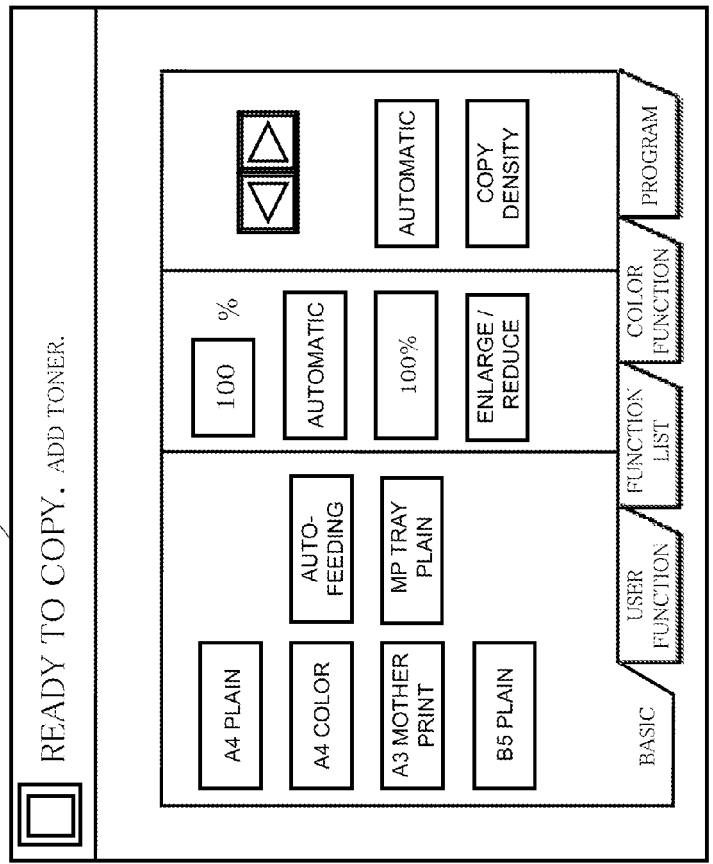
FIG. 14 illustrates a diagram of a display screen of a conventional input display device.

The basic setting screen 2, which has substantially the same configuration as that of the typical touch panel (FIG. 14), represents a display area in which operation keys and the like that allow basic operation settings are arranged in a fixed manner, and corresponds to a first display operation area according to the present invention.

The operation history screen 3 represents a display area that allows operation as well as successive display of the operation history in response to a selection of an arbitrary operation key made through the basic setting screen 2, and corresponds to a second display operation area according to the present invention.

The touch panel 1 is mounted to the image forming apparatus, and functions as an operation panel.

Figure 2:
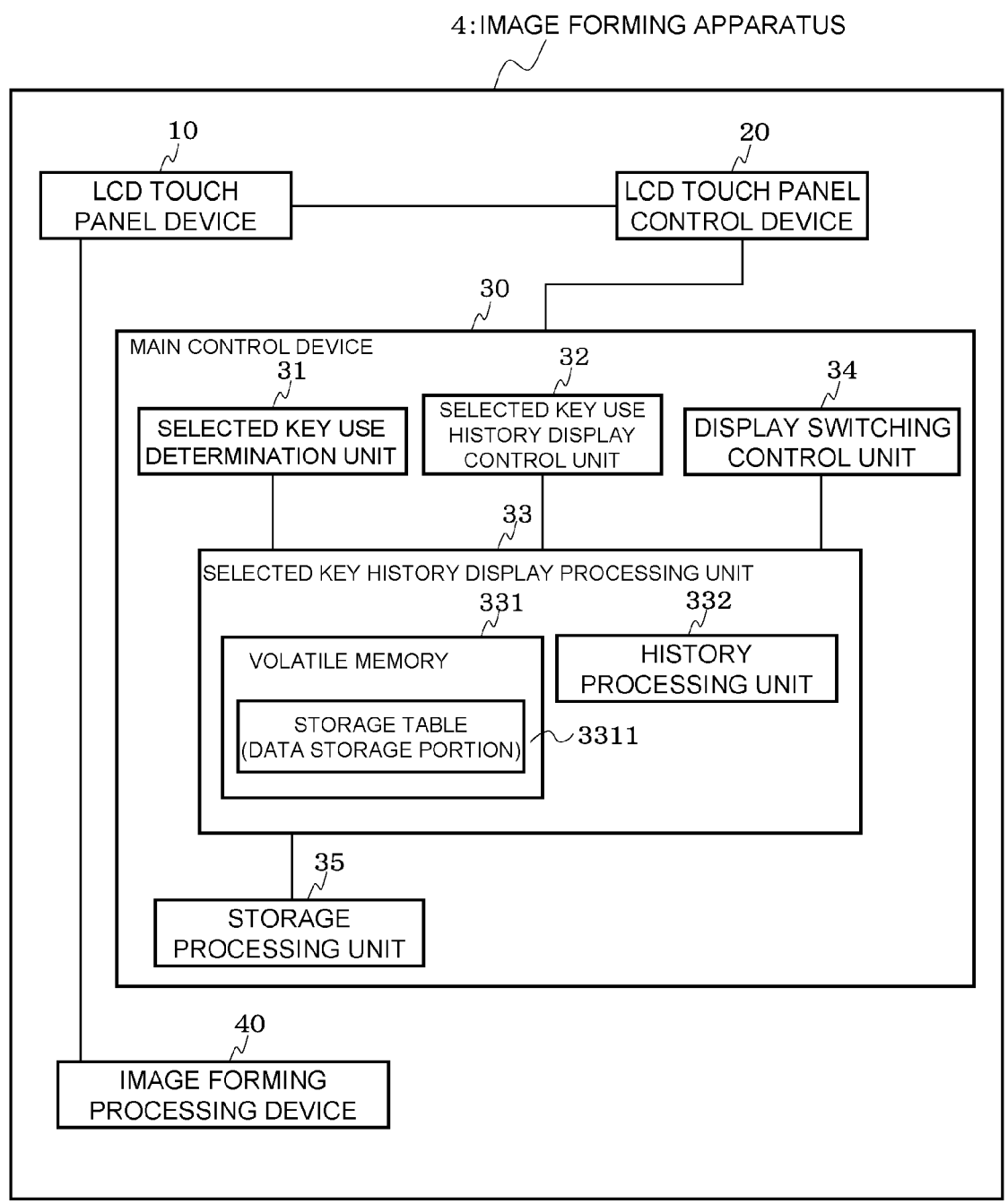
FIG. 2 illustrates a block diagram of a schematic configuration of the image forming apparatus including the touch panel according to the embodiment of the present invention.

FIG. 2 illustrates a block diagram of a schematic configuration of the image forming apparatus including the touch panel according to the embodiment of the present invention.

An image forming apparatus 4 provided with the touch panel 1 according to this embodiment includes an LCD touch panel device 10, an LCD touch panel control device 20, a main control device 30, and an image forming processing device 40.

The LCD touch panel device 10 includes the touch panel 1 provided with a liquid crystal display (LCD). The LCD touch panel device 10 displays a screen necessary to operate the operation keys and the like (including the basic setting screen 2 and the operation history screen 3) on the LCD, and serves as an input interface that enables a user to operate the operation keys through the LCD. By operating the LCD touch panel device 10, the image forming processing is executed.

The LCD touch panel control device 20 represents a chipset that performs processings involved in intermediation between the LCD touch panel device 10 and the main control device 30. To be specific, the LCD touch panel control device 20 transmits, to a selected key use determination unit 31, information on the selected operation key input through the LCD touch panel device 10. In addition, the LCD touch panel control device 20 displays the operation history received from a selected key use history display control unit 32 and an operation screen received from a display switching control unit 34 onto the LCD touch panel device 10.

Figure 13:
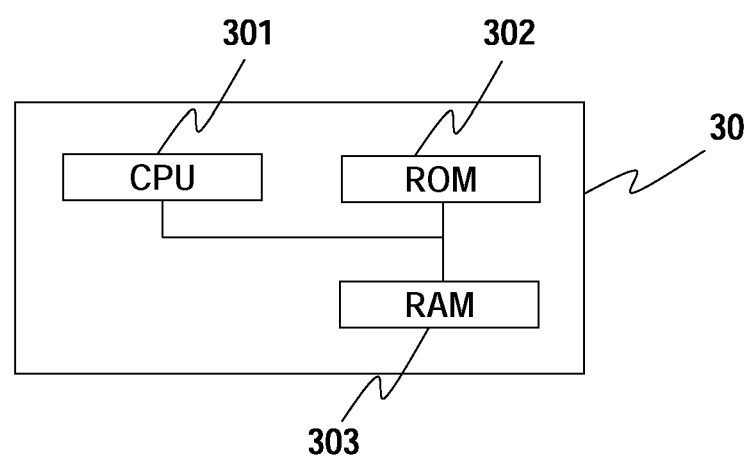
FIG. 13 illustrates a hardware architecture of a main control device illustrated in FIG. 2.

The main control device 30 controls the displaying of the operation keys onto the LCD touch panel device 10 through the intermediation of the LCD touch panel control device 20. FIG. 13 illustrates a hardware architecture of the main control device 30. The main control device 30 is configured as, for example, a computer including a central processing unit (CPU) 301, a read only memory (ROM) 302, and a random access memory (RAM) 303. In the main control device 30, the CPU 301 loads and executes program codes stored in the ROM 302 or other such recording medium into the RAM 303 to thereby implement respective processing units. When the program codes are executed, the RAM 303 temporarily stores the program codes and data necessary to execute the program codes, and is used as a work area.

The main control device 30 executes input display program codes according to the embodiment of the present invention to thereby implement the selected key use determination unit 31, the selected key use history display control unit 32, a selected key history display processing unit 33, the display switching control unit 34, and a storage processing unit 35 as the respective processing units.

The selected key use determination unit 31 receives information on the operation key selected by the user through the intermediation of the LCD touch panel control device 20, and determines which of the operation keys on which screen has been selected.

The selected key history display processing unit 33 includes a volatile memory 331 and a history processing unit 332.

The volatile memory 331 represents a volatile memory storage, such as the RAM 303, that enables the storage processing unit 35 to store results of a determination performed by the selected key use determination unit 31 as operation history information. To be specific, the volatile memory 331 includes pairs, the pairs including (i) the screen on which the operation key has been selected and (ii) an operation content related to the operation key. The pairs are stored in a storage table 3311 within the volatile memory 331 in a selected order.

The history processing unit 332 extracts operation history information having a predetermined condition from the operation history information stored in the volatile memory 331, and transmits the extracted operation history information to the selected key use history display control unit 32.

Here, the predetermined condition represents the screen on which the operation key has been selected and the operation content related to the operation key. In this embodiment, the predetermined condition represents a content of the operation key operated through the basic setting screen 2, for example, "A4 plain", "A4 color", or "duplex/separate".

The above-mentioned operation history information stored in the storage table 3311 is deleted by the storage processing unit 35 at a determined time, for example, when each user completes a printing processing, when a predetermined period of time elapses after the user's previous selection of the operation key, or when a "close" key on the operation history screen 3 described later is depressed. In addition, the operation history that has been displayed on the operation history screen 3 is cleared by the LCD touch panel control device 20.

Based on the operation history information received from the selected key history display processing unit 33, the selected key use history display control unit 32 displays the operation history onto the LCD touch panel device 10 through the intermediation of the LCD touch panel control device 20. To be specific, the selected key use history display control unit 32 transmits information on an operation key corresponding to the operation history to be displayed on the operation history screen 3 to the LCD touch panel control device 20. Then, the LCD touch panel control device 20 outputs/displays the operation keys selected by the user to/on the LCD touch panel device 10 in order.

When the operation key displayed on the operation history screen 3 is selected, the display switching control unit 34 displays the operation screen in the basic setting screen 2 that is instructed by the operation key, and switches the display thereto from the current display in the basic setting screen 2 through the intermediation of the LCD touch panel control device 20. To be specific, the display switching control unit 34 transmits the information on the operation screen to be displayed on the basic setting screen 2 to the LCD touch panel control device 20. Then, the LCD touch panel control device 20 displays the operation screen of the layer that is instructed by the selected operation key onto the LCD touch panel device 10.

The storage processing unit 35 stores the operation history information into the storage table 3311 within the volatile memory 331.

The image forming processing device 40 represents the processing executing device that executes a predetermined image forming processing based on an operation performed on the LCD touch panel device 10. The image forming processing device 40 executes the image forming processing based on an input received from the LCD touch panel device 10. To be specific, the image forming processing device 40 includes a computer provided with a CPU, a ROM, and a RAM in the same manner as the main control device 30. The image forming processing device 40 is further provided with a print engine. The image forming processing device 40 executes the program codes in the same manner as the main control device 30 to thereby process image data for image formation such as printing. Here, the RAM functions as an input buffer that receives input data to be printed out, and also temporarily stores the image data before/after receiving an image processing and calculation data. The CPU transfers the processed image data to the print engine. The print engine prints the transferred image data on a printing sheet.

Described next is a manner in which the operation history is displayed on the touch panel 1 of the image forming apparatus 4 according to this embodiment having the above-mentioned configuration.

Figure 3:
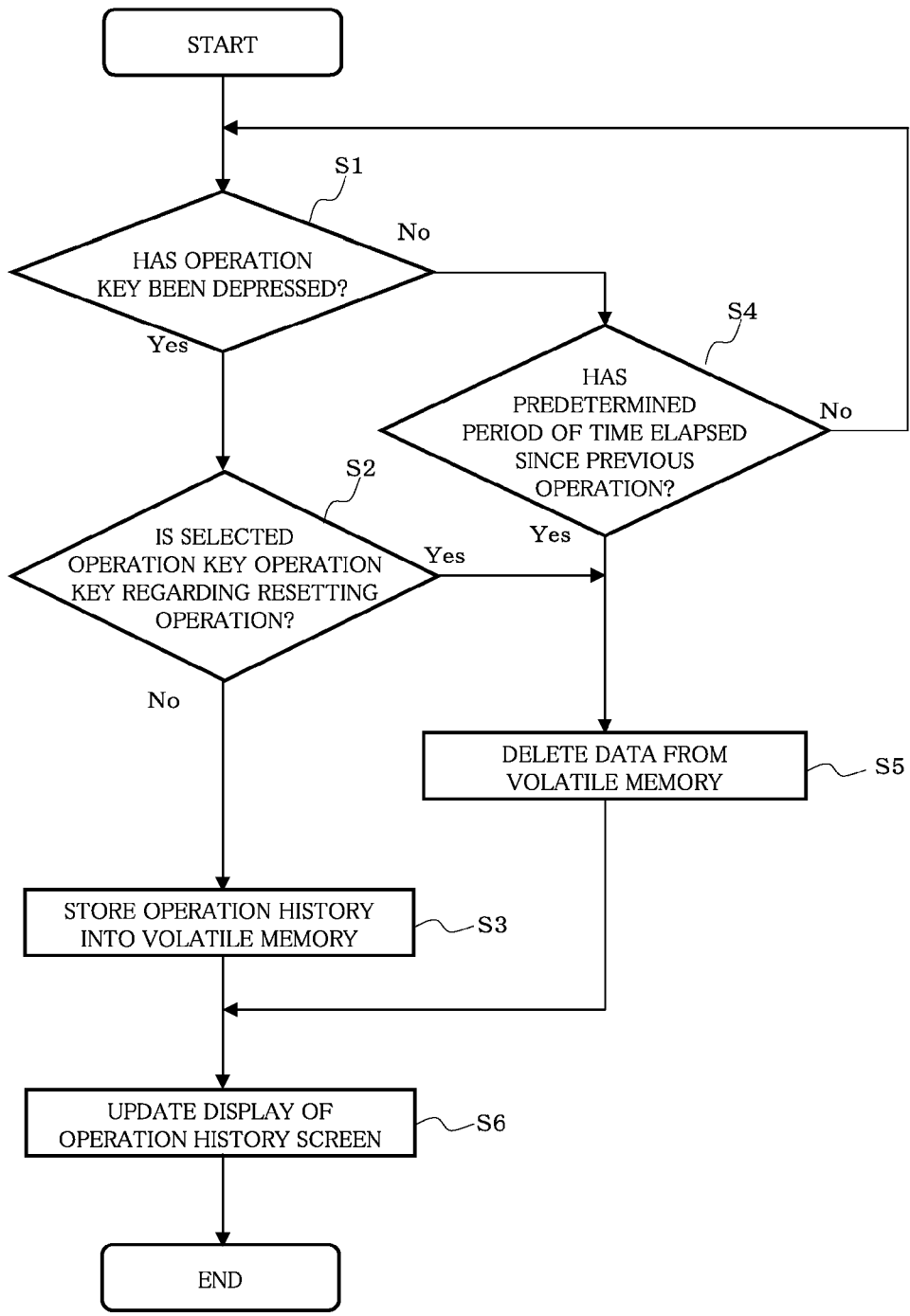
FIG. 3 illustrates a flowchart with respect to an operation history display processing performed on the touch panel according to the embodiment of the present invention.

FIG. 3 illustrates a flowchart with respect to an operation history display processing performed on the touch panel 1 according to the embodiment of the present invention.

First, the LCD touch panel control device 20 determines whether or not an operation key has been depressed on the touch panel 1 (Step S1). When it is determined that the operation key has been depressed (Step S1: Yes), the selected key use determination unit 31 then determines which of the operation keys on which screen is the selected operation key, and detects whether or not the selected operation key is an operation key regarding a resetting operation (Step S2).

Subsequently, when it is detected that the selected operation key is not the operation key regarding the resetting operation, (Step S2: No), the storage processing unit 35 stores operation history information into the storage table 3311 within the volatile memory 331 (Step S3). The operation history information includes, for example, pairs of the screen on which an operation has been performed and a content of the associated operation. The pairs are stored in the order in which the operation keys have been selected by the user.

On the other hand, when it is determined in Step S1 that the operation key has not been depressed (Step S1: No), it is then determined by a timer (not shown) whether or not a predetermined period of time has elapsed since the previous operation (Step S4).

Subsequently, when it is determined that the predetermined period of time has not elapsed since the previous operation, the LCD touch panel control device 20 waits until the operation key is depressed (Step S4: No). On the other hand, when it is determined that the predetermined period of time has elapsed since the previous operation (Step S4: yes), the storage processing unit 35 deletes the operation history information stored in the storage table 3311 within the volatile memory 331 (Step S5). Alternatively, even if it is determined in Step S2 that the selected operation key is the operation key regarding the resetting operation (Step S2: Yes), the storage processing unit 35 deletes the operation history information stored in the storage table 3311 (Step S5).

Subsequently, the history processing unit 332 extracts operation history information related to an operation performed on the basic setting screen 2 from the operation history information stored in the storage table 3311, and transmits the extracted operation history information to the selected key use history display control unit 32. Then, the selected key use history display control unit 32 transmits information on an operation key corresponding to the received operation history information to the LCD touch panel control device 20. Then, the LCD touch panel control device 20 displays the operation key corresponding to the operation history on the operation history screen 3 to update display contents (Step S6).

The above-mentioned processing of Steps S1 to S6 constitutes a procedure for one operation, and each time an operation key is selected to perform a subsequent operation setting, the processing is repeated to renew the display of the operation history.

Next, by referring to FIGS. 4 to 8, a specific example is used to describe a detailed procedure for operating the touch panel.

The following specific example is described by taking an example in which images are to be formed and output with a document set to "2-sided copying (duplex/separate)" (1-sided original→2-sided copy), its finishing set to "left/right binding", a direction of the document set to "portrait", and its sheet feeding set to "MP tray" (Multipurpose tray).

FIGS. 4 to 8 illustrate diagrams of display screens for describing screen transitions occurring when the operation history is being displayed.

Figure 4:
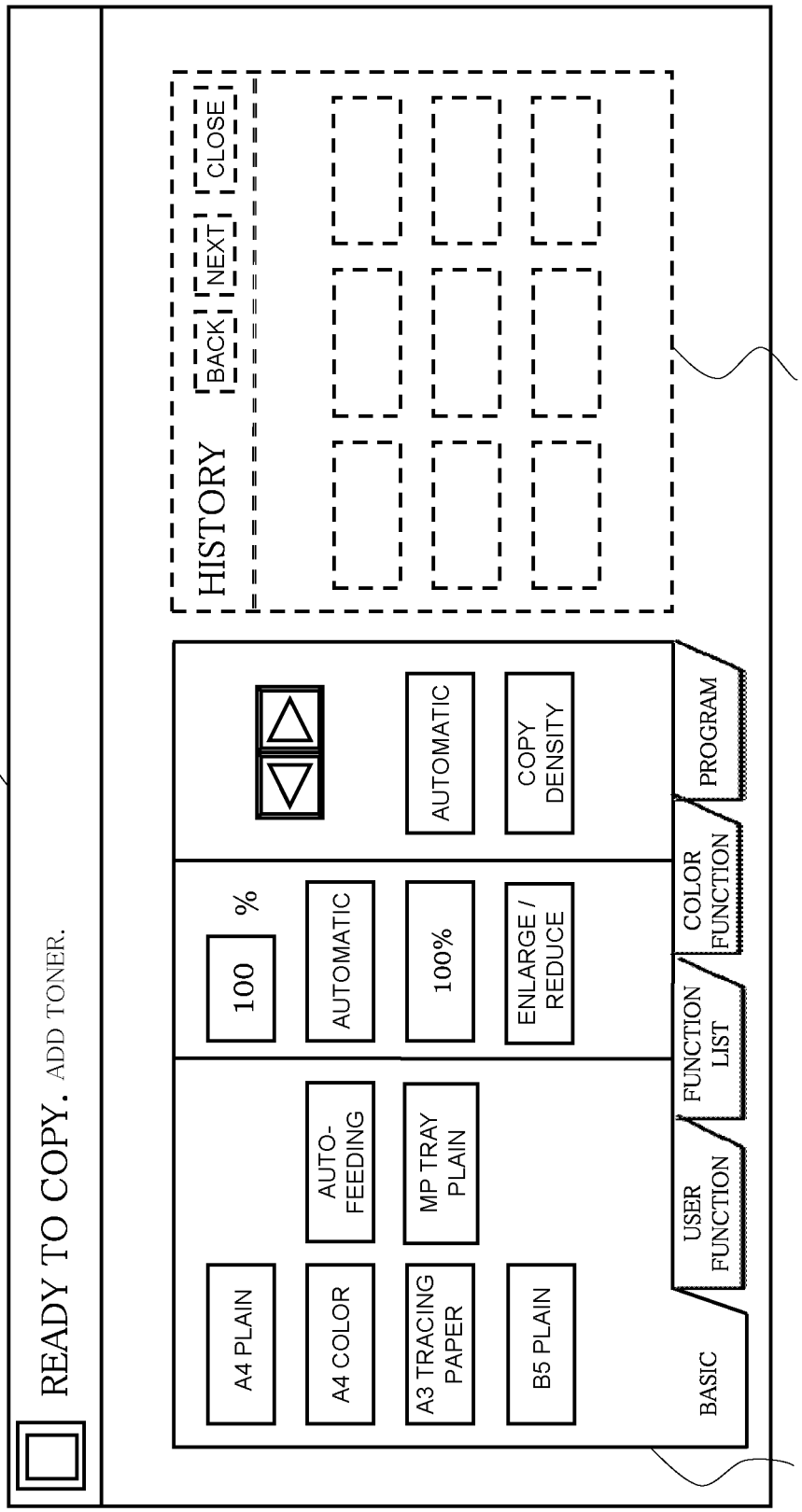
FIG. 4 illustrates a diagram of a first display screen for describing screen transitions occurring when an operation history is being displayed on the touch panel according to the embodiment of the present invention.

As illustrated in FIG. 4, in a state (initial state) where the user is not performing any operation on the touch panel 1, only the operation keys constituting the basic setting screen 2 are displayed on the touch panel 1, and the operation history screen 3 is not displayed. This state is maintained until a selection is made from the operation keys of the basic setting screen 2.

Figure 5:
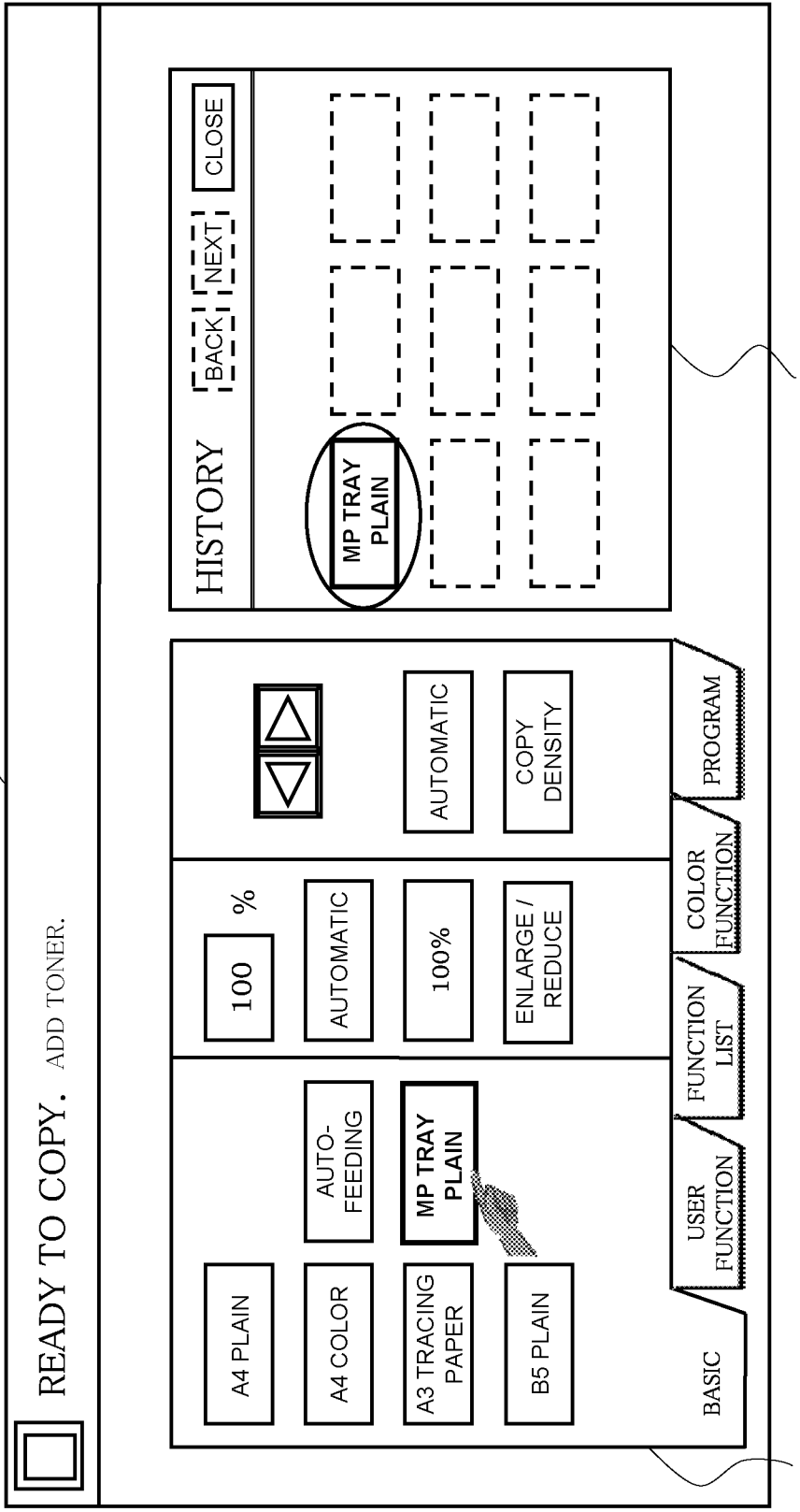
FIG. 5 illustrates a diagram of a second display screen for describing the screen transitions occurring when the operation history is being displayed on the touch panel according to the embodiment of the present invention.

In the initial state, as illustrated in FIG. 5, in order to cause a desired processing to be executed, the user selects "MP tray plain" indicated on the basic setting screen 2 of the LCD touch panel device 10.

When such an operation is performed, an operation signal is input to the main control device 30 through the intermediation of the LCD touch panel control device 20, and the selected key use determination unit 31 determines that a "MP tray plain" key on the basic setting screen 2 has been operated.

Then, the storage processing unit 35 stores information related to the selected "MP tray plain" key as operation history information into the storage table 3311 within the volatile memory 331. Subsequently, the selected key use history display control unit displays operation history information extracted from the operation history information stored in the storage table 3311 onto the operation history screen 3 as the item "MP tray plain" of the operation history through the intermediation of the LCD touch panel control device 20. Note that an arbitrary value can be set in advance as the number of operation history items to be displayed, and the user can set/change the desired number of items to be displayed.

Figure 6:
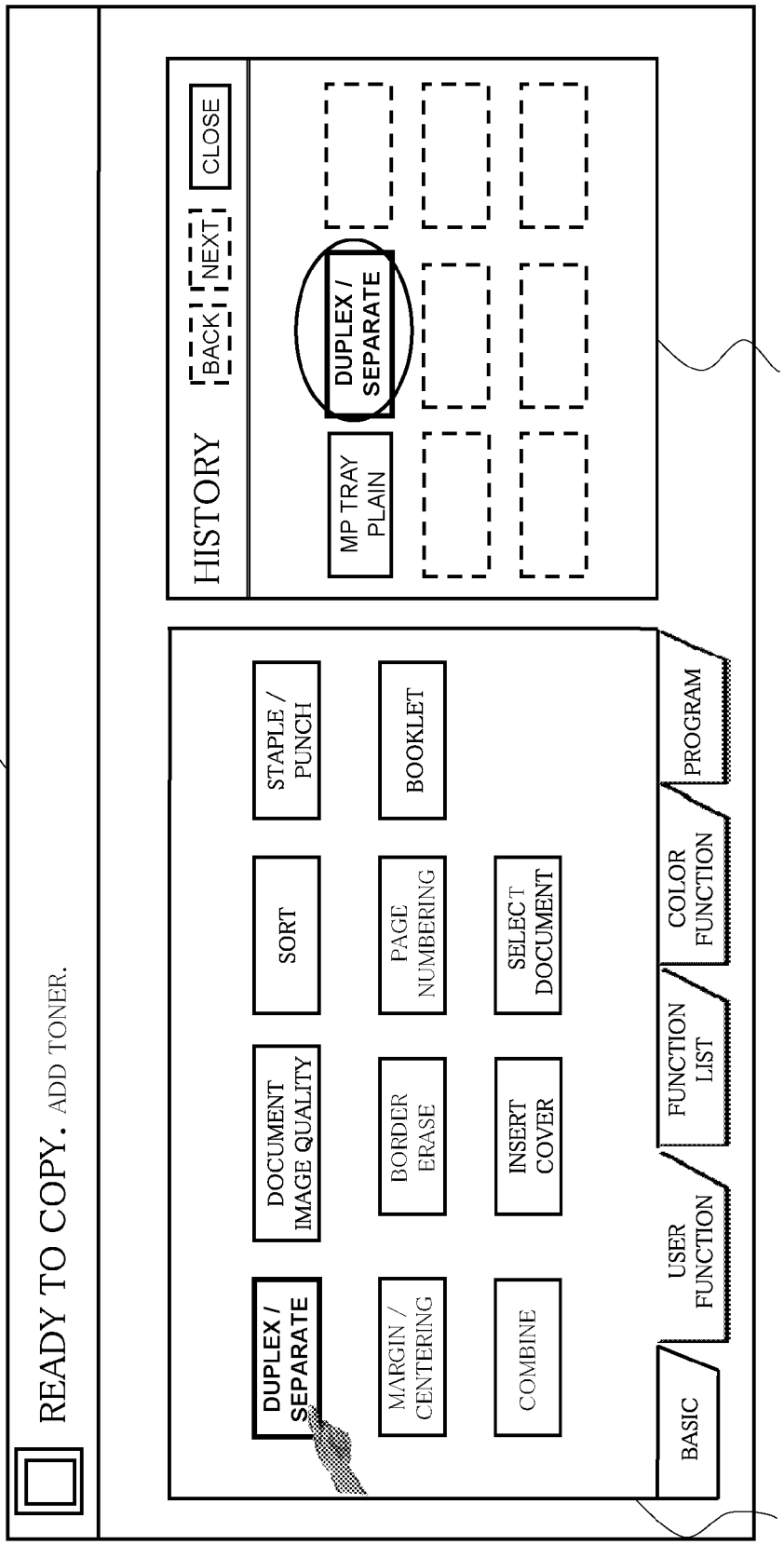
FIG. 6 illustrates a diagram of a third display screen for describing the screen transitions occurring when the operation history is being displayed on the touch panel according to the embodiment of the present invention.

Subsequently, as illustrated in FIG. 6, when "duplex/separate" indicated on the basic setting screen 2 is selected, the selected key use determination unit 31 determines that a "duplex/separate" key on the basic setting screen 2 has been operated, and in the same manner as described above, the item "duplex/separate" of the operation history is displayed onto the operation history screen 3.

Figure 7:
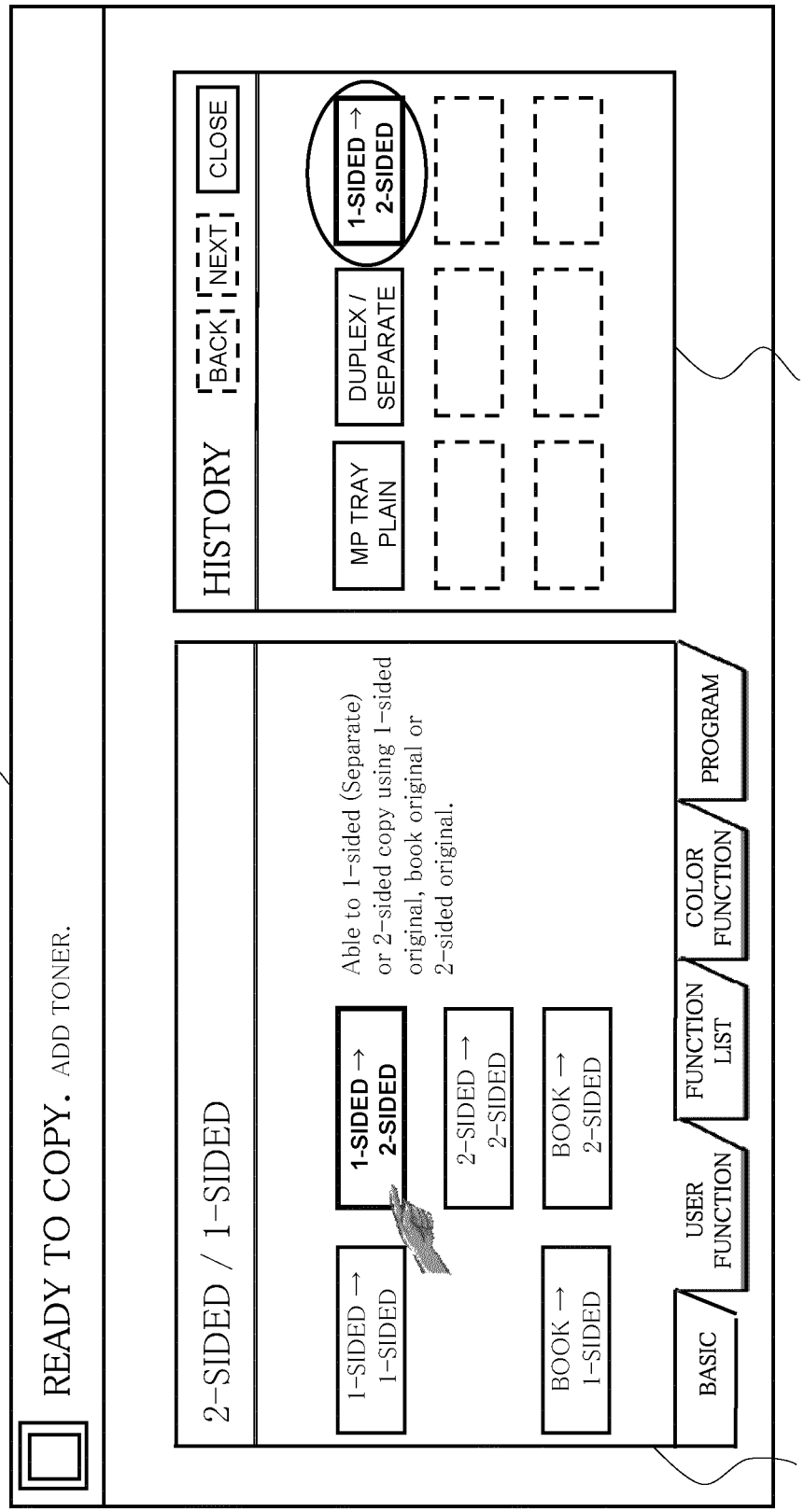
FIG. 7 illustrates a diagram of a fourth display screen for describing the screen transitions occurring when the operation history is being displayed on the touch panel according to the embodiment of the present invention.

Additionally, as illustrated in FIG. 7, the selecting of the operation key activates a lower layer to display a "2-sided/1-sided" screen onto the basic setting screen 2. When the user selects "1-sided→2-sided" indicated on the basic setting screen 2, the selected key use determination unit 31 determines that a "1-sided→2-sided" key on the basic setting screen 2 has been operated, and the item "1-sided→2-sided" of the operation history is displayed on the operation history screen 3.

Figure 8:
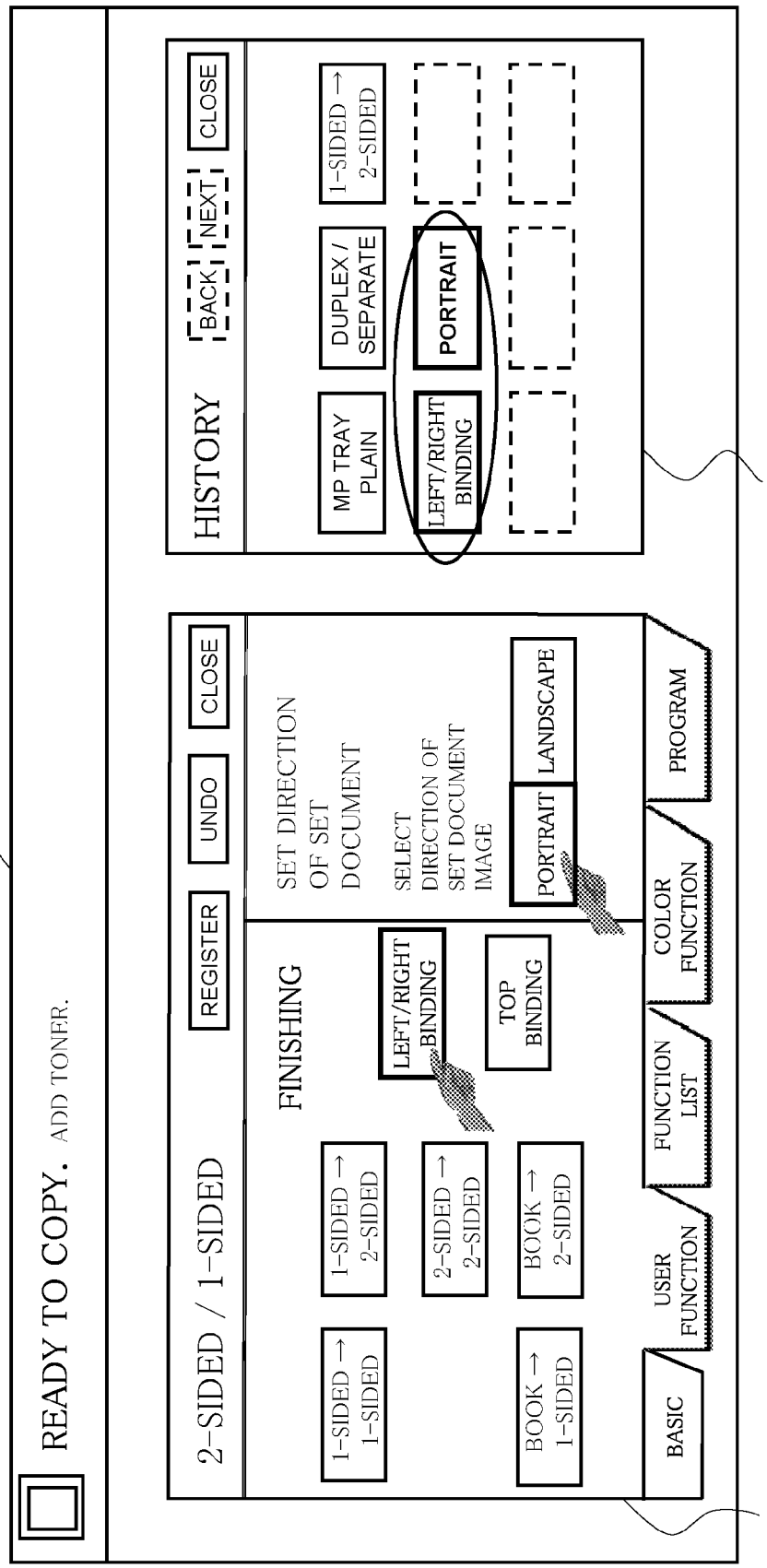
FIG. 8 illustrates a diagram of a fifth display screen for describing the screen transitions occurring when the operation history is being displayed on the touch panel according to the embodiment of the present invention.

Subsequently, as illustrated in FIG. 8, when the user successively selects the "left/right binding" and "portrait" that are indicated on the basic setting screen 2, the selected key use determination unit 31 determines that a "left/right binding" key and a "portrait" key on the basic setting screen 2 have been operated, and the items "left/right binding" and "portrait" of the operation history are successively displayed onto the operation history screen 3.

Therefore, the touch panel 1 enables the operation keys to be displayed on and operated through the basic setting screen 2 in the same manner as the conventional technology, and also enables a series of operation processes operated through the basic setting screen 2 to be displayed on the operation history screen 3. Accordingly, it is possible for the user not only to perform the operation with a conventional screen layout, but also to easily confirm the user's operation history and perform the operation with increased convenience.

In this embodiment, the number of operation history items to be displayed on the operation history screen 3 is set to, for example, a maximum of nine, and when the number exceeds nine, operations of a "back" key and a "next" key become effective. Selections of these keys cause screen transitions, which enable all of the operation history items to be confirmed. In addition, the selection of the "close" key causes the operation history information to be deleted as described above, and also causes the operation history indicated on the operation history screen 3 to be reset.

According to this embodiment, by providing an operation history screen on the touch panel mounted to the image forming apparatus, the operation history is displayed in response to the selection of the operation key. This enables the user to clearly view the operation history at a glance and to confirm the contents of a series of operations. Further, it is possible to locate the desired operation key with ease, which can increase usability and reduce the burden on the user.

Described next is a manner in which the operation is corrected on the operation history screen 3 of the touch panel 1 of the image forming apparatus 4.

Figure 9:
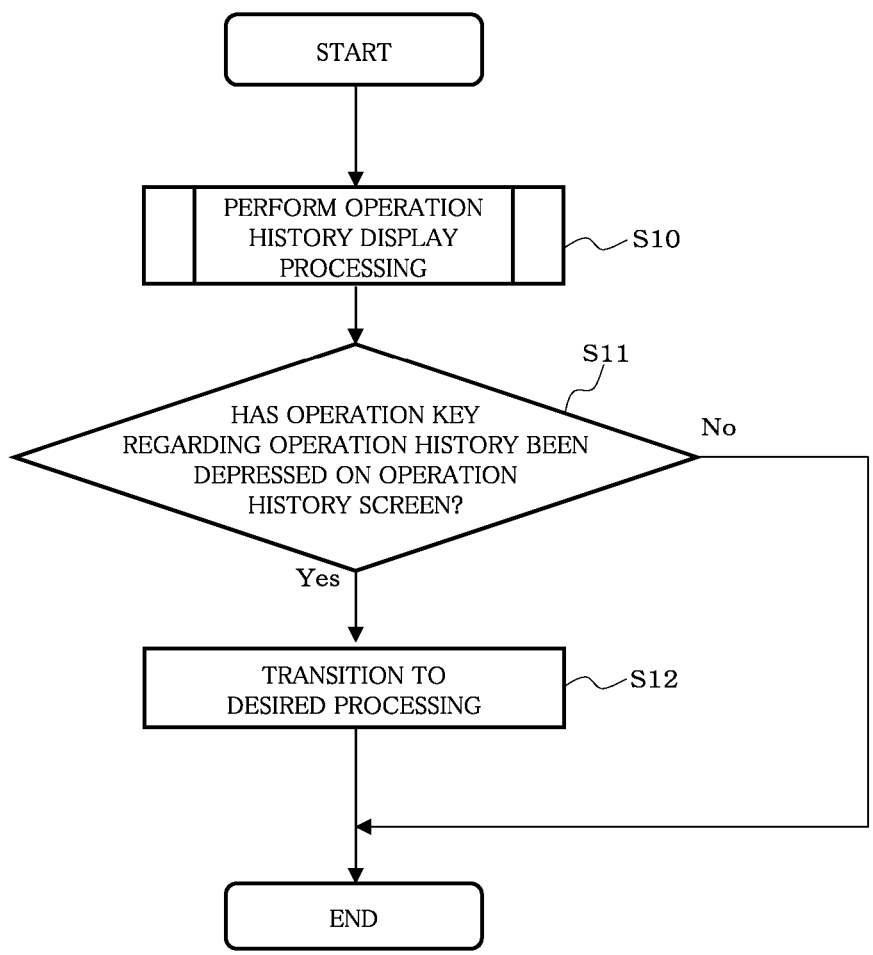
FIG. 9 illustrates a flowchart with respect to an operation history correction processing performed through the touch panel according to the embodiment of the present invention.

FIG. 9 illustrates a flowchart with respect to an operation history correction processing performed through the touch panel 1 according to the embodiment of the present invention.

First, the above-mentioned operation history display processing (Steps S1 to S6) is performed (Step S10).

Subsequently, the selected key use determination unit 31 determines whether or not an operation key regarding the operation history has been depressed on the operation history screen 3 of the touch panel 1 (Step S11). When it is determined that an operation key has been depressed (Step S11: Yes), through the intermediation of the LCD touch panel control device 20, the display switching control unit 34 causes the basic setting screen 2 to transition from the currently-displayed operation screen to the operation screen of a layer that is instructed by the selected operation key (Step S12). Note that when it is determined that an operation key has not been depressed on the operation history screen 3 (Step S11: No), the processing ends.

Figure 10:
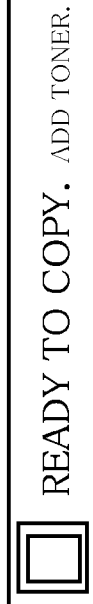
FIG. 10 illustrates a diagram of a first display screen for describing screen transitions occurring when a previous operation is being corrected on the touch panel according to the embodiment of the present invention.
Figure 11:
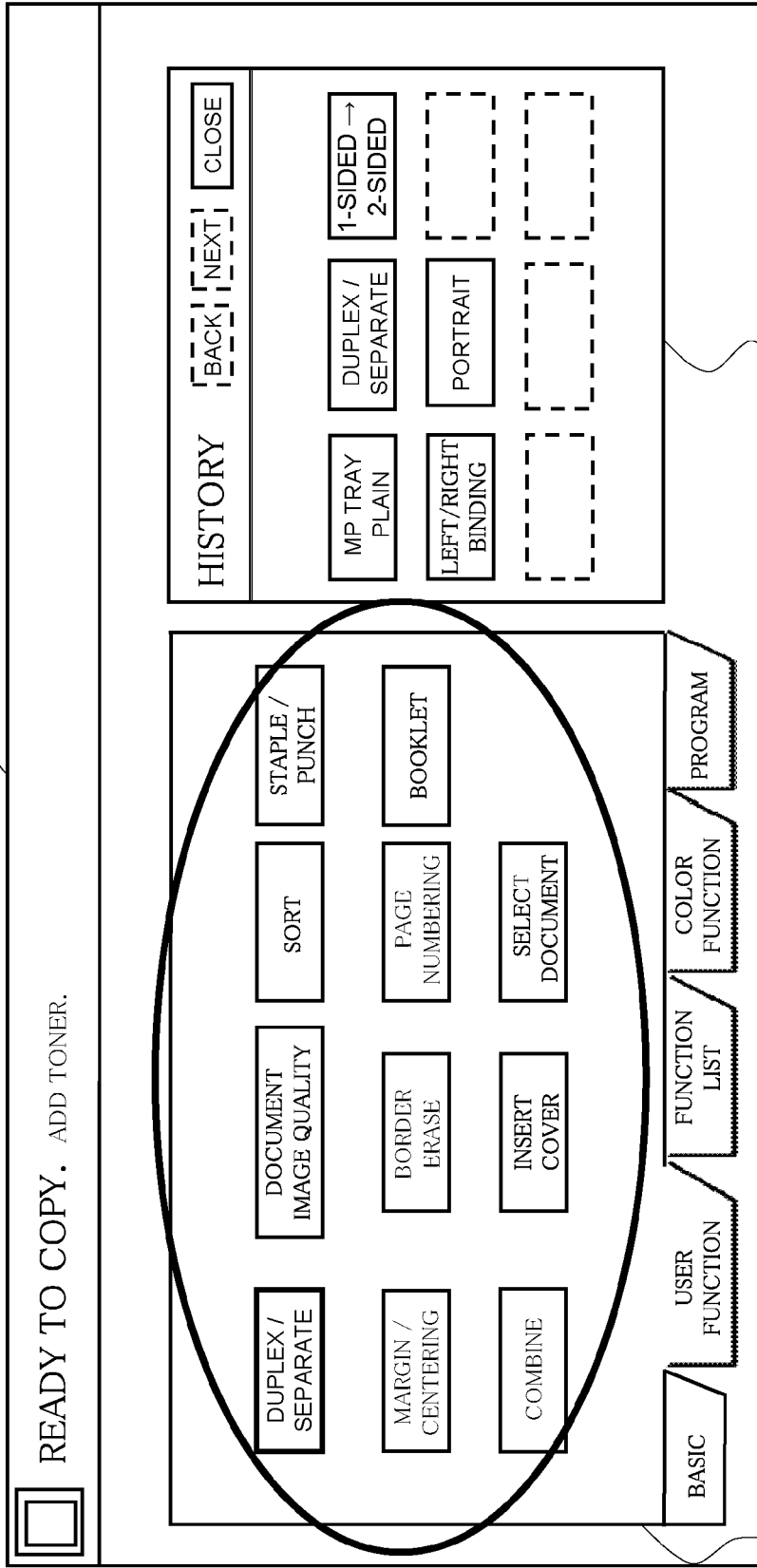
FIG. 11 illustrates a diagram of a second display screen for describing the screen transitions occurring when the previous operation is being corrected on the touch panel according to the embodiment of the present invention.
Figure 12:
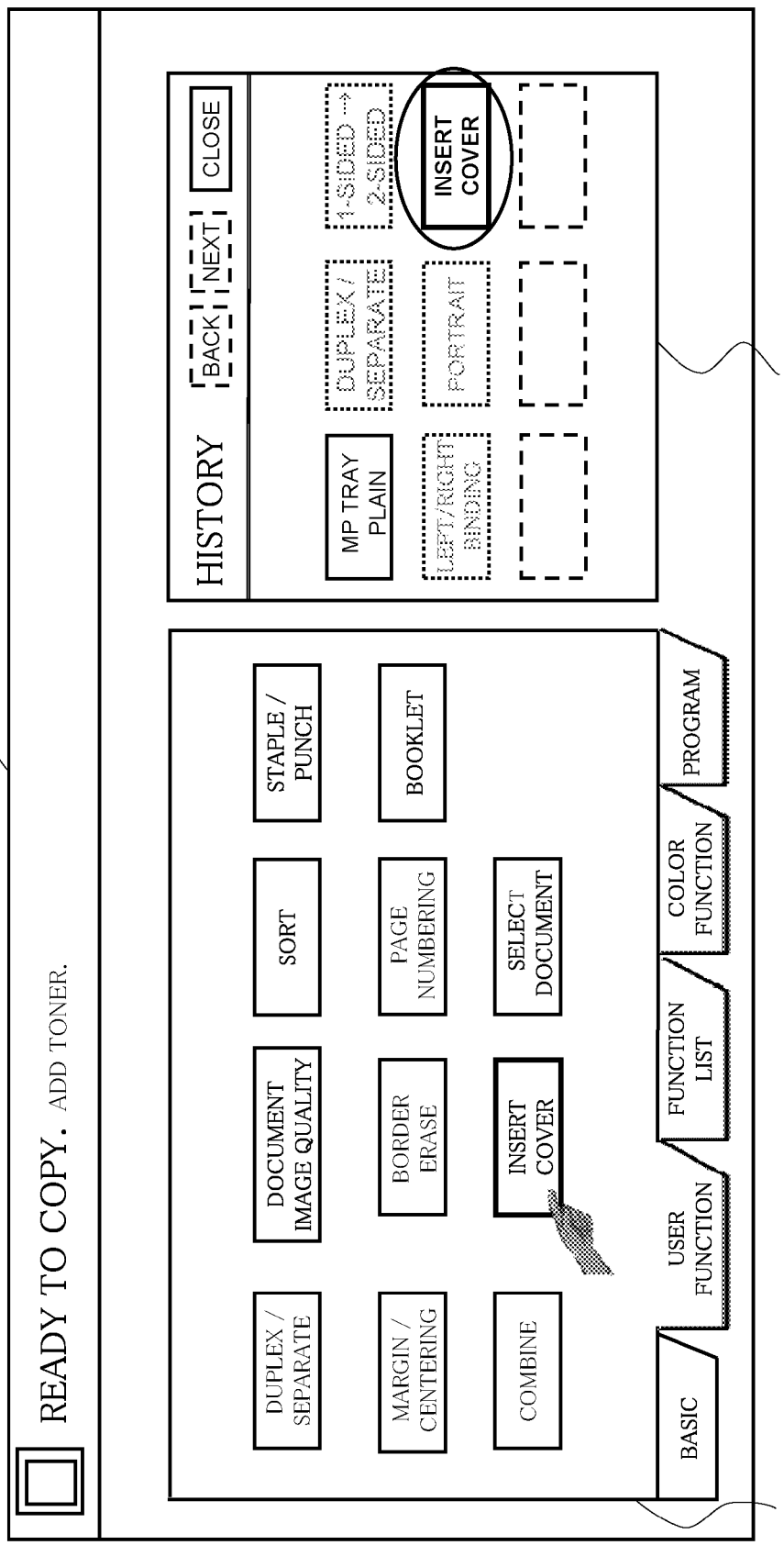
FIG. 12 illustrates a diagram of a third display screen for describing the screen transitions occurring when the previous operation is being corrected on the touch panel according to the embodiment of the present invention.

Next, by referring to FIGS. 10 to 12, a specific example is used to describe a detailed procedure for operating the touch panel.

In the following specific example, a correction is made from "2-sided copying (duplex/separate)" selected in a previous operation to "insert cover" after an operation procedure for the above-mentioned operation history display processing has been performed.

FIGS. 10 to 12 illustrate diagrams of display screens for describing screen transitions occurring when the previous operation is being corrected.

As illustrated in FIG. 10, in a state in which the same operation procedure for the operation history display processing has been performed, the user selects "duplex/separate" whose operation is to be corrected from the operation history screen 3. At this time, the operation screen of the layer that is instructed by the selected "duplex/separate" key is displayed on the basic setting screen 2 by being switched from the currently-displayed operation screen by the display switching control unit 34 through the intermediation of the LCD touch panel control device 20. Therefore, as illustrated in FIG. 11, the operation screen indicated when "duplex/separate" was selected at the beginning is displayed again on the basic setting screen 2.

This eliminates the need to follow layers in order, and can reduce needless operations.

Subsequently, as illustrated in FIG. 12, the user selects an "insert cover" key from the basic setting screen 2 in order to correct the previous operation. Then, the selected key use determination unit 31 determines that the "insert cover" key on the basic setting screen 2 has been operated, and the storage processing unit 35 stores information related to the selected "insert cover" key as operation history information into the storage table 3311. At the same time, as illustrated in FIG. 12, the item "insert cover" of the operation history is displayed onto the operation history screen 3.

At this time, the items "duplex/separate" to "portrait" of the operation history are grayed out on the operation history screen 3 by the selected key use history display control unit 32. Therefore, the operation keys selected in the previous operations and the operation processes are not erased from the screen but can be viewed by the user. In addition, it is possible to visually perceive that the previous operation has been corrected.

As to the subsequent operations, in the same manner as the above-mentioned operation procedure, each time the operation is performed through the basic setting screen 2, information related to the performed operation is stored as operation history information into the storage table 3311, and the display of the operation history on the operation history screen 3 is updated.

Note that the operation history items displayed on the operation history screen 3 are successively displayed in a chronological order of selected time from the top left of the operation history screen 3, but may be successively displayed in a reverse chronological order of selected time. This allows the user to easily locate the operation key without operating the "back" key or the "next" key when a selection is to be made of an operation performed at the beginning rather than the last-performed operation.

According to this embodiment, on the touch panel mounted to the image forming apparatus, when the operation key is selected from the operation history screen on the touch panel, the operation screen of the layer that is instructed by the selected operation key is displayed by being switched from the current display to a basic setting screen. This causes the screen to transition across the layers, which can reduce needless operations.

Described next are the input display program codes for the image forming apparatus provided with the touch panel.

The present invention supplies an image forming apparatus with a computer-readable recording medium on which the input display program codes for realizing the above-mentioned functions according to the embodiment of the present invention are recorded. The invention causes a computer (control component including a CPU and an MPU) constituting the image forming apparatus to read and execute the program codes stored on the recording medium. Accordingly, the function of each unit of the present invention is implemented by the input display program codes as software and the computer as hardware resources in cooperation with each other.

Examples of the computer-readable recording medium recorded with the input display program codes include a magnetic disk, an optical disk, a semiconductor memory such as a ROM, and any other medium that can be read by the image forming apparatus. Further, the input display program codes for the image forming apparatus which are recorded on the recording medium can be read into the image forming apparatus by inserting the recording medium directly into the image forming apparatus, or may be read into the image forming apparatus by being downloaded via a communication line.

Hereinabove, the preferred embodiment has been described to illustrate the input display device, the electronic apparatus, and the input display program codes according to the present invention, but the devices according to the present invention are not limited to the above-mentioned embodiment, and various modifications can naturally be made within the scope of the present invention.

For example, the input display device according to the present invention is not limited to the touch panel, and may have any configuration as long as the input display device enables the operation history to be displayed on an independently-configured screen in response to a selection of the operation key.

Further, the above-mentioned embodiment can be applied by not only mounting the input display device to the image forming apparatus but also mounting or connecting the input display device to another electronic apparatus. In other words, any kind of equipment or device can provide advanced operability and convenience by mounting the input display device (touch panel) according to the present invention as an input device. Any equipment or device may be used so long as it is the electronic apparatus provided with an input device receiving an instruction to execute a predetermined processing and the processing executing device that executes the predetermined processing based on the instruction received by the input device.

The present invention can be applied to apparatuses and electronic apparatuses that are provided with the input display device such as the touch panel and enable the operation history to be displayed thereon. Examples thereof include: image forming apparatuses such as printers, facsimile machines, copiers, and multi-function peripherals; home electrical appliances such as video recorders, television receivers, and air conditioners; mobile information devices such as mobile telephones and portable media players; and stationary information terminals such as automatic teller machines and kiosk terminals.

In part, in an embodiment, the invention may be summarized as follows.

The input display device according to the embodiment of the present invention comprises an operation key, an operation panel, a selected key use determination unit, a storage processing unit, and a selected key use history display control unit. The operation key is primarily selected to thereby execute a predetermined processing to be executed by being selected. The operation panel includes a first display operation area and a second display operation area. The first display operation area enables operation screens to be switched hierarchically based on the selected operation key and to display a fixed-arrangement of operation keys in respective layers. The second display operation area displays an operation history indicating that the operation key has been selected. The selected key use determination unit is configured to determine which of the operation keys has been selected when the operation key is selected from one of the first display operation area and the second display operation area. The storage processing unit is configured to successively store results determined by the selected key use determination unit into a storage device as operation history information. The selected key use history display control unit is configured to display the operation history information stored in the storage device into the second display operation area.

Accordingly, the operation history information is displayed onto the screen (operation history screen) that displays the operation history, and is provided on the operation panel. This enables the user to clearly view the history of the selected operations at a glance and to easily perceive the contents of a series of operation settings. Further, by recognizing the displayed operation history, the user can easily select the desired operation key corresponding to a portion to be corrected. This enables increased usability and a reduced burden on the user.

In addition to the above-mentioned configuration, the selected key use history display control unit may be configured to display the operation keys selected by the user in order.

In addition to the above-mentioned configuration, the selected key history display control unit may be configured to display a history of depressed keys in reverse chronological order.

This makes it possible for the user to easily grasp a series of operation processes.

In addition to the above-mentioned configuration, the input display device comprises a history processing unit. Here, the history processing unit may be configured to extract operation history information having a predetermined condition from the operation history information stored in a storage device. And the selected key use history display control unit may be configured to display the operation history information extracted by the history processing unit into the second display operation area.

Accordingly, it is possible to display only necessary items of the operation history on the operation history screen.

In addition to the above-mentioned configuration, the history processing unit may be configured to extract the operation history information related to the operation key from the storage device when the operation key is selected from the first display operation area.

Therefore, when the operation key is selected from the screen (basic setting screen) that is provided on the operation panel, and is used for performing basic operation settings on the device, it is possible to display only the operation history items operated through the basic setting screen onto the operation history screen. Accordingly, it is possible to display only the operations performed through the basic setting screen on the touch panel onto the operation history screen.

In addition to the above-mentioned configuration, the input display device comprises a display switching control unit that may be configured to display an operation screen in the first display operation area that is instructed by the operation key, when the operation key is selected from the second display operation area.

Therefore, when the operation key is selected from the operation history screen, the display of the operation screen related to the layer that is instructed by the selected operation key is switched from the current display to the basic setting screen. This causes the screen to instantaneously transition to an upper layer by switching the display even if the operation has been performed on a lower layer, which can reduce needless operations.

In addition to the above-mentioned configuration, the selected key use history display control unit may be configured to gray out the operation keys that are displayed in the second display operation area upon displaying a predetermined operation key.

Therefore, the operation keys selected in the previous operations and the operation processes are not erased from the screen but can be viewed by the user. In addition, it is possible to visually perceive that the previous operation has been corrected.

In addition to the above-mentioned configuration, the selected key use history display control unit is configured to remove the history of the operation keys displayed in the second display operation area when an operation key corresponding to a resetting operation is depressed.

In addition to the above-mentioned configuration, the selected key use history display control unit may be configured to remove the history of the operation keys displayed in the second display operation area when a predetermined period of time has elapsed since a previous selection of the operation key.

Further, the electronic apparatus according to the embodiment of the present invention comprises an input device and a processing executing device. Here, the input device receives an instruction to execute a predetermined processing. The processing executing device executes the predetermined processing based on the instruction received by the input device. In addition, the input device includes the above-mentioned input display device.

For example, on the image forming apparatus to which the touch panel is mounted as the input display device, the operation keys on the touch panel can be selected to thereby instruct and execute various processings related to image formation, to be specific, an image forming processing, a printing processing, a sheet conveying processing, and the like.

The invention can be applied to various electronic apparatuses that require key inputting, and produces technical effects superior in versatility/extensibility.

Further, the computer-readable recording medium according to the embodiment of the present invention stores input display program codes. The input display program codes comprise a first program code, a second program code, a third program code, a fourth program code and a fifth program code. Here, the first program code causes an operation key to be selected and to execute a predetermined processing associated with the selected operation key. The second program code causes an operation panel to display the first display operation area and a second display operation area. The first display operation area enables operation screens to be switched hierarchically based on the selected operation key and to display a fixed-arrangement of operation keys in respective layers. The second display operation area displays an operation history indicating that the operation key has been selected. The third program code causes a selected key use determination unit to determine which of the operation keys has been selected, when the operation key is selected from one of the first display operation area and the second display operation area. The fourth program code causes a storage processing unit to successively store results determined by the selected key use determination unit into a storage device as operation history information. The fifth program code causes a selected key use history display control unit to display the operation history information stored in the storage device into the second display operation area.

Accordingly, the present invention can be implemented by installing the input display program codes not only on the so-called input display device but also on another device having an inputting operation function.

As described above, according to the present invention, the operation history screen added onto the touch panel makes it possible to clearly view the history of the user's own operations at a glance and to grasp the series of current operation settings. Further, even if the operation has been performed on the lower layer, the operation performed through the operation history screen can cause the screen to instantaneously transition to the upper layer.

Consequently, it is possible to provide an input display device, an electronic apparatus, and a computer-readable recording medium recording the input display program codes, each of which are superior in operability.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

What is claimed is:

1. An input display device, comprising:
    first operation key that is selected to execute a predetermined processing;
    an operation panel including:
        a first display operation area that, based on selecting the first operation key, displays a first operation screen, wherein the first operation screen enables operation screens to be switched hierarchically and displays a fixed-arrangement of operation keys in respective layers; and
        a second display operation area that displays an operation history, wherein the operation history includes a second operation key indicating that the first operation key has been selected;
    a selected key use determination unit configured to determine when the first operation key is selected from the first display operation area and the second operation key is selected from the second display operation area;
    a storage processing unit configured to successively store results determined by the selected key use determination unit into a storage device as operation history information;
    a selected key use history display control unit configured to display the operation history information stored in the storage device into the second display operation area; and
    a display switching control unit configured to, based on selecting the second operation key from the second display operation area, restore the first operation screen in the first display operation area, wherein other operation keys in the second display area are grayed out upon selecting a third operation key.

2. The input display device according to claim 1, wherein the selected key use history display control unit is configured to display the operation keys selected in order.

3. The input display device according to claim 1, wherein the selected key history display control unit is configured to display a history of depressed keys in reverse chronological order.

4. The input display device according to claim 1, further comprising a history processing unit configured to extract operation history information having a predetermined condition from the operation history information stored in the storage device,
    wherein the selected key use history display control unit is configured to display the operation history information extracted by the history processing unit into the second display operation area.

5. The input display device according to claim 4, wherein the history processing unit is configured to extract the operation history information related to the first operation key from the storage device when the first operation key is selected from the first display operation area.

6. The input display device according to claim 1, wherein the selected key use history display control unit is configured to remove the history of the operation keys displayed in the second display operation area when an operation key corresponding to a resetting operation is depressed.

7. The input display device according to claim 1, wherein the selected key use history display control unit is configured to remove the history of the operation keys displayed in the second display operation area when a predetermined period of time has elapsed since a previous selection of the operation key.

8. An electronic apparatus, comprising:
    an input device that receives an instruction to execute a predetermined processing; and
    a processing executing device that executes the predetermined processing based on the instruction received by the input device,
    wherein the input device comprises the input display device according to claim 1.

9. The electronic apparatus according to claim 8, wherein the processing executing device is an image forming processing device that executes a predetermined image forming processing based on the instruction received by the input device.

10. A non-transitory computer-readable recording medium storing input display program codes, comprising:
    a first program code for causing first operation key to be selected and to execute a predetermined processing associated with the selected operation key;
    a second program code for causing an operation panel to display a first display operation area and a second display operation area, wherein the first display operation area, based on selecting the first operation key, displays a first operation screen which enables operation screens to be switched hierarchically and displays a fixed-arrangement of operation keys in respective layers, and
    wherein the second display operation area displays an operation history, wherein the operation history includes a second operation key indicating that the first operation key has been selected;
    a third program code for causing a selected key use determination unit to determine when the first operation key is selected from first display operation area and the second operation key is selected from the second display operation area;
    a fourth program code for causing a storage processing unit to successively store results determined by the selected key use determination unit into a storage device as operation history information;
    a fifth program code for causing a selected key use history display control unit to display the operation history information stored in the storage device into the second display operation area; and
    a sixth program code for causing a display switching control unit to, based on selecting the second operation key from the second display operation area, restoring the first operation screen in the first display operation area, wherein other operation keys in the second display area are grayed out upon selecting a third operation key.

11. The non-transitory computer-readable recording medium according to claim 10, wherein the fifth program code causes the selected key use history display control unit to display the operation keys selected in order.

12. The non-transitory computer-readable recording medium according to claim 10, wherein the fifth program code causes the selected key history display control unit to display a history of depressed keys in reverse chronological order.

13. The non-transitory computer-readable recording medium according to claim 10, further comprising a seventh program code causing a history processing unit to extract operation history information having a predetermined condition from the operation history information stored in the storage device,
   wherein the fifth program code causes the selected key use history display control unit to display the operation history information extracted by the history processing unit into the second display operation area.

14. The non-transitory computer-readable recording medium according to claim 13, wherein the seventh program code causes the history processing unit to extract the operation history information related to the first operation key from the storage device when the first operation key is selected from the first display operation area.

15. The non-transitory computer-readable recording medium according to claim 10, wherein the fifth program code causes the selected key use history display control unit to remove the history of the operation keys displayed in the second display operation area when an operation key corresponding to a resetting operation is depressed.

16. The non-transitory computer-readable recording medium according to claim 10, wherein the fifth program code causes the selected key use history display control unit to remove the history of the operation keys displayed in the second display operation area when a predetermined period of time has elapsed since a previous selection of the operation key.

\* \* \* \* \*